United States Patent
Li et al.

(10) Patent No.: US 9,846,517 B2
(45) Date of Patent: Dec. 19, 2017

(54) TOUCH PANEL HAVING ELECTROMAGNETIC FUNCTIONAL LINES AND DRIVING METHOD THEREOF

(71) Applicants: Shanghai Tianma Micro-Electronics Co., Ltd., Shanghai (CN); Tianma Micro-Electronics Co., Ltd., Shenzhen (CN)

(72) Inventors: Jialing Li, Shanghai (CN); Conghua Ma, Shanghai (CN); Feng Lu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/521,409

(22) Filed: Oct. 22, 2014

(65) Prior Publication Data

US 2016/0026302 A1   Jan. 28, 2016

(30) Foreign Application Priority Data

Jul. 23, 2014   (CN) .......................... 2014 1 0352899

(51) Int. Cl.
*G06F 3/041* (2006.01)
*G06F 3/044* (2006.01)
(Continued)

(52) U.S. Cl.
CPC .......... *G06F 3/044* (2013.01); *G09G 3/3208* (2013.01); *G09G 3/3611* (2013.01); *G09G 2300/0426* (2013.01)

(58) Field of Classification Search
CPC ...................................................... G06F 3/044
(Continued)

(56) References Cited

U.S. PATENT DOCUMENTS

| | | | |
|---|---|---|---|
| 2014/0043284 A1* | 2/2014 | Park | G06F 3/044 345/174 |
| 2014/0071064 A1* | 3/2014 | Cho | G06F 3/044 345/173 |

(Continued)

FOREIGN PATENT DOCUMENTS

| | | |
|---|---|---|
| CN | 202649974 U | 1/2013 |
| CN | 102916729 A | 2/2013 |

(Continued)

*Primary Examiner* — Long D Pham
(74) *Attorney, Agent, or Firm* — Alston & Bird LLP

(57) ABSTRACT

The present invention discloses a touch panel, a driving method thereof and an electronic device. The touch panel includes an active area and an inactive area, a touch electrode and an electromagnetic functional line. The touch electrode is located in the active area, the electromagnetic functional line is electrically connected to the touch electrode to form an electromagnetic communication line, the electromagnetic communication line comprises a first terminal and a second terminal each configured to be coupled to an electrical signal to implement touch sensing function and electromagnetic communication function by controlling the electrical signal. At least the above two functions may both be advantageously implemented by the touch panel, and original lines in the touch panel are reused (multiplexed) to reduce additional lines, thereby improving the lightweight and slim features of the product and reducing the product costs.

14 Claims, 9 Drawing Sheets

(51) Int. Cl.
G09G 3/36 (2006.01)
G09G 3/3208 (2016.01)

(58) Field of Classification Search
USPC .......................................... 345/173
See application file for complete search history.

(56) References Cited

U.S. PATENT DOCUMENTS

2014/0071083 A1* 3/2014 Yoo .................. G06F 3/046
  345/174
2014/0160377 A1* 6/2014 Yamagishi .......... G06F 3/044
  349/12
2014/0306925 A1* 10/2014 Yeh .................. G06F 3/0416
  345/174

FOREIGN PATENT DOCUMENTS

| CN | 203616742 U | 5/2014 |
| KR | 20130065920 A | 6/2013 |

* cited by examiner

TOUCH PANEL HAVING ELECTROMAGNETIC FUNCTIONAL LINES AND DRIVING METHOD THEREOF

CROSS-REFERENCES TO RELATED APPLICATIONS

This application claims the benefit of priority to Chinese Patent Application No. 201410352899.3, filed with the Chinese Patent Office on Jul. 23, 2014 and entitled "TOUCH PANEL, DRIVING METHOD THEREOF AND ELECTRONIC DEVICE", the content of which is incorporated herein by reference in its entirety.

TECHNICAL FIELD

The present disclosure relates to the field of touch technologies, and in particularly to a touch panel and a driving method thereof, and an electronic device.

BACKGROUND OF THE INVENTION

With the advance of smart mobile phones, a Near Field Communication (NFC) function is added into more and more mobile phones. The NFC technology is a short-range radio communication technology, which is evolved from the fusion of radio frequency identification and interconnection technologies. By employing the NFC technology, an electronic device may support emulation of a non-contact Integrated Circuit (IC) card, a non-contact IC card reader and a short-range point-to-point communication function, thereby expanding the applications range of the electronic device. Integration of the NFC technology into an electronic device with a touch panel, such as a smart mobile phone, may further satisfy new demands for the smart mobile phones market.

In an electronic device with the NFC technology, the layout of an NFC electromagnetic coil not only affects the performance of the NFC technology, but also has an impact on the volume and weight of the electronic device per se. Currently, the NFC electromagnetic coil of the electronic device with the NFC technology is arranged on a Flexible Printed Circuit (FPC), which is then mounted to the body of the electronic device. This solution is easy to implement, but increases the volume of the electronic device such that the development needs of a light-weight and slim electronic device cannot be met.

BRIEF SUMMARY OF THE INVENTION

In view of the above problems, embodiments of the present invention provide a touch panel and a driving method thereof, and an electronic device to improve the performance of the touch panel and the electronic device.

In a first aspect of the present disclosure, a touch panel includes an active area and an inactive area, a touch electrode, and an electromagnetic functional line, where the touch electrode is located in the active area, the electromagnetic functional line is electrically connected to the touch electrode to form an electromagnetic communication line, the electromagnetic communication line includes a first terminal and a second terminal each coupled to an electrical signal to implement a touching sensing function and an electromagnetic communication function.

In a second aspect of the present disclosure, an electronic device is provided, where the electronic device includes a touch panel according to embodiments of the present disclosure.

In a third aspect of the present disclosure, a method for driving a touch panel is provided, where the method is configured to drive a touch panel having an active area and an inactive area, a touch electrode located in the active area, and an electromagnetic functional line electrically connected to the touch electrode and comprising a first terminal and a second terminal each coupled to an electrical signal to implement a touch sensing function and an electromagnetic function, the method includes:

inputting the electrical signal to the first terminal of the electromagnetic communication line or inputting the same electrical signal to both the first terminal and the second terminal of the electromagnetic communication line to implement the touch sensing function; or inputting different electromagnetic signals to the first terminal and the second terminal of the electromagnetic communication line to implement the electromagnetic communication function.

BRIEF DESCRIPTION OF THE DRAWINGS

The above and other features, objects and advantages of the present disclosure will become more apparent from the detailed description of non-limiting embodiments made with reference to the following accompanying drawings.

DETAILED DESCRIPTION OF THE PREFERRED EMBODIMENTS

Figure 1:
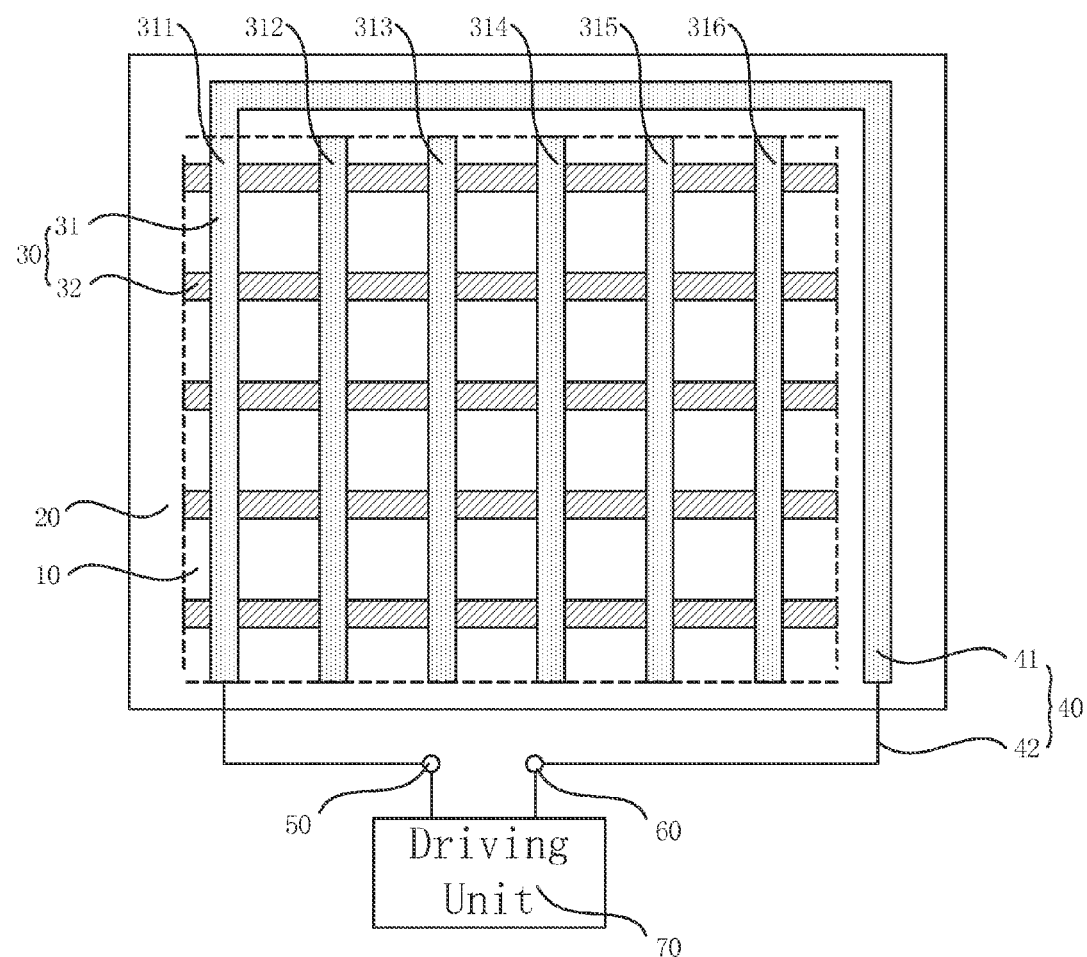
FIG. 1 is a schematic view showing a structure of a touch panel according to an embodiment of the present invention.

The present disclosure will be described in detail in combination with the accompanying drawings and embodiments. It is understood that the embodiments described herein are merely intended to explain the present disclosure but not to limit the present disclosure. It is additionally noted that only the portion of the structures relevant to the present disclosure is illustrated in the drawings instead of the entire structures, for ease of description.

Embodiments of the present invention provide a touch panel. The touch panel includes an active area and an inactive area, a touch electrode, and an electromagnetic functional line. The touch electrode is located in the active area, the electromagnetic functional line is electrically connected to the touch electrode to form an electromagnetic communication line, and the electromagnetic communication line includes a first terminal and a second terminal each configured to be coupled to an electrical signal, to implement functions of touch sensing and electromagnetic communication of the touch panel.

In an embodiment, an electromagnetic communication line is formed by arranging an electromagnetic functional line and reusing (multiplexing) a touch electrode, such that the touch sensing function and the electromagnetic communication function are implemented by the touch panel simultaneously or in a time division multiplex manner through controlling the electrical signal to the first terminal and the second terminal of the electromagnetic communication line. Therefore, the touch panel can perform the above two functions, and the original lines of the touch electrode in the touch panel are reused (multiplexed) to reduce new lines to be added, thus to improve the light-weighted and slim features of the product and reduce the cost of the product.

According to the present invention, the structure and the position of the electromagnetic functional line, the connection between the electromagnetic functional line and the touch electrode, and the controlling of the electrical signals of the touch panel can be implemented in a variety of ways. Some embodiments will be described in detail below.

An electromagnetic communication line in the touch panel may include a coil having one or more turns, and the structure of an electromagnetic communication line including for instance a coil having one turn is described according to an embodiment of the present invention below.

FIG. 1 is a schematic view showing a structure of a touch panel according to an embodiment of the present invention. In the present embodiment, a touch panel includes an active area 10 and an inactive area 20. The active area 10 is an area of the touch panel that is generally configured to provide an effective touch sensing function, and the non-active area 20 is a peripheral area located around the active area and is generally covered or shielded by a component such as a frame. The active area is an effective area that provides a touch sensing function to users, and other auxiliary lines or control lines for control are disposed in the peripheral area in a particular case are not included in the active area. In the case that the touch panel also has a display function, i.e. the panel touch includes a display area and a non-display area, the active area preferably overlaps the display area, thus a device such as a mobile phone or a tablet computer provides a function allowing a user to perform touch operations in the display area. Alternatively, the touch area may be slightly larger or smaller than the display area or partly overlapped with the display area, depending on actual requirements. The touch panel further include a touch electrode 30 and an electromagnetic functional line 40, the touch electrode 30 is located within the active area 10, the electromagnetic functional line 40 is connected to the touch electrode 30 to form an electromagnetic communication line. The electromagnetic communication line includes a first terminal 50 and a second terminal 60 each configured to be coupled to an electrical signal, to implement functions of touch sensing and electromagnetic communication of the touch panel.

The touch electrode 30 is an electrode line for implementing the touch sensing function, and may be arranged in various patterns depending on different touch sensing principles. As illustrated in FIG. 1, a typical pattern of the touch electrode 30 includes a plurality of driving electrode lines 31 arranged in parallel and a plurality of detecting electrode lines 32 arranged in parallel, and the driving electrode lines 31 are crossed by and electrically insulated from the detecting electrode lines 32, as shown in FIG. 1. In the present embodiment, the driving electrode lines 31 and/or the detecting electrode lines 32 may be used to form the electromagnetic communication line, and preferable the driving electrode line 31 is employed as the touch electrode 30 electrically connected with the electromagnetic functional line 40, because the touch sensing signals inputted to the driving electrode lines 31 are generally equipotential signals which are easy to control. In the following description, the driving electrode line 31 is employed as the touch electrode 30 electrically connected in the electromagnetic communication line as an example, however, it is to be understood by those skilled in the art that it is possible to utilize the detecting electrode lines 32, or both the driving electrode lines 31 and the detecting electrode lines 32 as the touch electrode 30 to form the electromagnetic communication line.

The electromagnetic functional line 40 is used to compensate the touch electrode 30 so as to form the electromagnetic communication line. The electromagnetic functional line 40 is merely required to be conductive. In order to avoid adding complexity of the internal structure of the touching panel, it is preferable to form the electromagnetic functional line 40 by an electrode wiring 41 and/or an integrated circuit wiring 42 formed on the substrate. The electrode wiring refers to a line formed on the substrate by using patterning and lithographic processes based on masking and etching, and may be formed by the same material in the same processes as the touch electrode 30 and so on. The integrated circuit wiring means a line that is electrically connected to the electrode wiring after the touch panel is formed, and is not subjected to a film forming process and is not formed on the surface of the substrate. For example, a line on an FPC may serve as the integrated circuit wiring 42, and is electrically connected to the electrode wiring 41 by welding, for the purpose of transferring electrical signals. The electrode wiring and the integrated circuit wiring are made through different processes and respectively possess their own advantages, that is, the electrode wiring is highly integrated in the touch panel at a low cost, and it is convenient to arrange a component such as a switch on the integrated circuit wiring and to exchange the component. Therefore, the electrode wiring and the integrated circuit wiring are appropriately used in combination with each other in the electromagnetic functional line, improving the product performance. The implements will be described below.

FIG. 1 illustrates an embodiment of the electromagnetic functional line, i.e. each turn of coil includes an electrode wiring 41 and an integrated circuit wiring 42, and the electrode wiring 41 is arranged in the non-active area 20; the electromagnetic communication line includes a touch electrode line 311, i.e. both the electrode wiring 41 and the integrated circuit wiring 42 are electrically connected to a touch electrode line 311 to form one turn of the coil.

In an embodiment, the electrode wiring 41 may be made of a metal or Indium Oxide. Preferably, the touch electrode 30 and the electrode wiring 41 are preferably made of the same material and formed simultaneously on the substrate of the touch panel, without adding the process of forming the electrode wiring 41, to improve productivity and reducing costs.

There are no shape and arrangement location limitations imposed on the electrode wiring 41 and the integrated circuit wiring 42, as long as the electrode wiring 41 and the integrated circuit wiring 42 can form a turn of the coil. However, preferably, an area surrounded by the turn of the coil should be as large as possible. Therefore, in the case of a single-turn coil, the electrode wiring 41 is preferably arranged in the non-active area 20 at a side away from the touch electrode 30 electrically connected with the electrode wiring 41, to obtain a relatively large area surrounded by the coil, without shielding the active area of the touch panel. As illustrated in FIG. 1, six driving electrode lines 311 to 316 arranged in parallel are taken as an example. The driving electrode line 311 of the touch electrode 30, i.e. a driving electrode line located at the leftmost side of the touch panel illustrated in FIG. 1, is electrically connected to the electrode wiring 41. In this case, the non-active area 20 of the touch panel surrounds the periphery of the active area 10. Given that the driving electrode line 311 has been determined, in view that the side farthest from the leftmost driving electrode line 311 is the rightmost side in the non-active area 20, the electrode wiring 41 electrically connected with the driving electrode line 311 should be arranged at the rightmost side, if possible. In order to connect the electrode wiring 41 at the rightmost side to the driving electrode line 311 at the leftmost side, the electrode wiring 41 at the upper part of the non-active area 20 is used to electrically connect the electrode wiring 41 at the rightmost side to the driving electrode line 311 at the leftmost side. The electrode wiring 41 in such arrangement may maximize the area surrounded by the turn of the coil. As illustrated in FIG. 1, the electrode wiring 41 is preferably arranged along a fold line, but the electrode wiring may be arranged along a straight line, or a fold line or a curved line. The integrated circuit wiring 42 is disposed at one side of the touch panel, e. g. an area in which an IC is electrically connected to the touch panel, to maximize the integration of the touch panel and reduce the volume of the touch panel.

When the touch electrode 30 electrically connected to the electrode wiring 41 is not located at the edge of the active area 10, it is preferable to dispose the electrode wiring 41 at a position in the non-active area 20 as far as possible away from the touch electrode 30 electrically connected to the electrode wiring 41, to increase the area surrounded by the coil as large as possible. If a plurality of coil turns are formed on the touch panel, for the touching electrode 30 in each coil turn, the arrangement position of the electrode wiring 41 electrically connected to the touch electrode 30 is chosen based on the above-described principles as long as the electrode wirings 41 are electrically insulated from one another.

In the touch panel illustrated in FIG. 1, a first terminal 50 and a second terminal 60 are electrically connected to the integrated circuit wiring 42 of the electromagnetic communication line, and electrical signals may be inputted via these two terminals, so that the touch sensing function and the electromagnetic communication function can be implemented simultaneously or in a time division multiplex manner.

Preferably, the touch panel further includes a driving unit 70 to provide electrical signals to the touch panel. The driving unit 70 may be implemented by an IC chip or an FPC, where an IC chip is electrically connected to the FPC, or a controlling circuit similar to the IC chip as well as auxiliary components such as capacitors and resistors are included on the FPC per se, and then wirings on the FPC are used as the integrated circuit wiring, which is connected to the electrode wiring or the touch electrode. In an embodiment, the driving unit 70 is configured to implement at least one of the following functions:

a first function of providing a touch sensing signal to the first terminal 50 of the electromagnetic communication line and controlling the second terminal 60 to suspend (to be in a floating or tri-state) so as to implement the touch sensing function;

a second function of providing touch sensing signals to the first terminal 50 and the second terminal 60 of the electromagnetic communication line so as to implement the touch sensing function;

a third function of providing electromagnetic signals to the first terminal 50 and the second terminal 60 of the electromagnetic communication line so as to implement the electromagnetic communication function; and a fourth function of providing a combined signal of a touch sensing signal and an electromagnetic signal which have different frequencies to the first terminal 50 and the second terminal 60 of the electromagnetic communication line so as to simultaneously implement the touch sensing function and the electromagnetic communication function.

In the first function, the second terminal 60 is suspended (brought to a floating state (tri-state) by an internal operation of the driving unit 70, and a touch sensing signal is inputted (provided) to the first terminal 50, for example a voltage driving signal is inputted (provided) to the driving electrode line 31, thereby implementing the touch sensing function. The voltage drop of the voltage driving signal in the driving electrode line 31 is compensated by controlling a touch sensing algorithm. Taken the above IC chip as the driving unit 70 in an exemplary embodiment, the IC chip may provide a plurality of pins to output electrical signals. In the implementation of the first function, the touch sensing signal is outputted (provided) by a first pin of the IC chip which is connected to the first terminal 50, so as to input (provide) a touch sensing signal to the driving electrode line 31. A second pin of the IC chip is connected with the second terminal 60, but the second pin is set to be suspended (in a floating state or in tri-state) inside the IC chip or set to be suspended (in a floating state or in tri-state) by peripheral auxiliary circuitry of the IC chip during the implementation of the first function. Thus, the driving electrode line 31 only receives the touch sensing signal from the first terminal 50, to detect a touching action.

In the second function, the touch sensing signals may be inputted (provided) simultaneously through the first terminal 50 and the second terminal 60 by the driving unit 70, for example, equipotential voltage driving signals are inputted (provided) into the driving electrode line 31 at both the first terminal 50 and the second terminal 60, such that equipotential voltages are present at both terminals of the driving electrode line 31, to achieve the touch sensing function. In implementing the touch sensing function, the equipotential touch sensing signals are respectively inputted to the first terminal 50 and the second terminal 60 through two pins of the IC chip, thus the equipotential touch sensing signals are inputted (provided) to two terminals of the driving electrode line 31 such that the driving electrode line 31 is maintained equipotential to detect a touching action.

In the third function, electromagnetic signals may be inputted (provided) simultaneously through the first terminal 50 and the second terminal 60 by the driving unit 70 to implement the electromagnetic communication function. The appropriate electromagnetic signals in accordance with specific requirements of the electromagnetic communication function may be inputted. For example, for a typical NFC function, electrical signals with different voltages are generally inputted (provided) to the first terminal 50 and the second terminal 60, i.e. the inputted electrical signals cause a change in the current flowing through the coil of the electromagnetic communication line, thereby generating an electromagnetic field and transmitting electromagnetic signals at a desired frequency, to implement the NFC function.

The first, second and third functions may be performed in a time division multiplex manner, for example, the first or second function is performed alternately with the third function, such that the touch sensing function and the electromagnetic communication function are implemented in the touch panel in a time division multiplex manner.

In the fourth function, the touch sensing function and the electromagnetic communication function are implemented simultaneously, i.e. an electrical signal with combined different frequencies is inputted at (provided to) the first terminal 50 and the second terminal 60. The electrical signal with combined different frequencies is formed by superimposing a touch sensing signal and an electromagnetic signal with different frequencies. Typically, the touch sensing signal is a low-frequency signal, and the electromagnetic signal is a high-frequency signal. After the low-frequency signal and the high-frequency signal are superimposed, a change of the low-frequency signal only may be identified (detected) in the signal on the touch electrode 30 through identification (detection) algorithms of the touch panel, thereby implementing the touch sensing function, at the same time, an electromagnetic field is generated by the electromagnetic communication line due to a change of the high-frequency signal, thereby implementing the electromagnetic communication function. Therefore, these two touch sensing and electromagnetic communication functions may be implemented at the same time.

In the technical solution of the previous embodiment of the present invention, a preferable implementation of the touch panel is provided, where the touch electrode is reused (multiplexed) in the electromagnetic communication line, and both touch sensing function and electromagnetic communication function are achieved by the touch panel through the control of the electrical signals, such that the functions of the product are enriched and lines to be added to the touch panel are minimized, which improves the light-weight performance of the product.

Another Embodiment

Figure 2A:
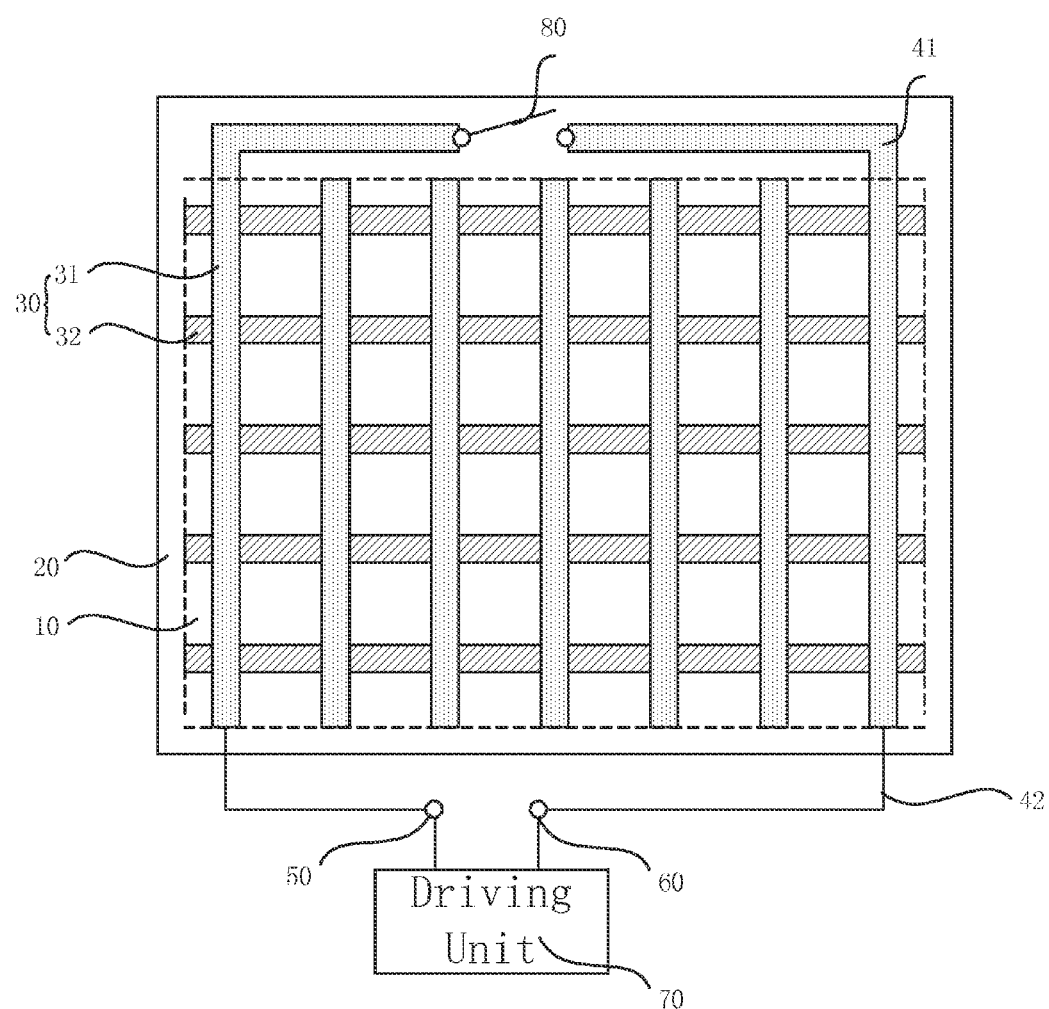
FIG. 2A and FIG. 2B are schematic views showing a structure of a touch panel according to another embodiment of the present invention.
Figure 2B:
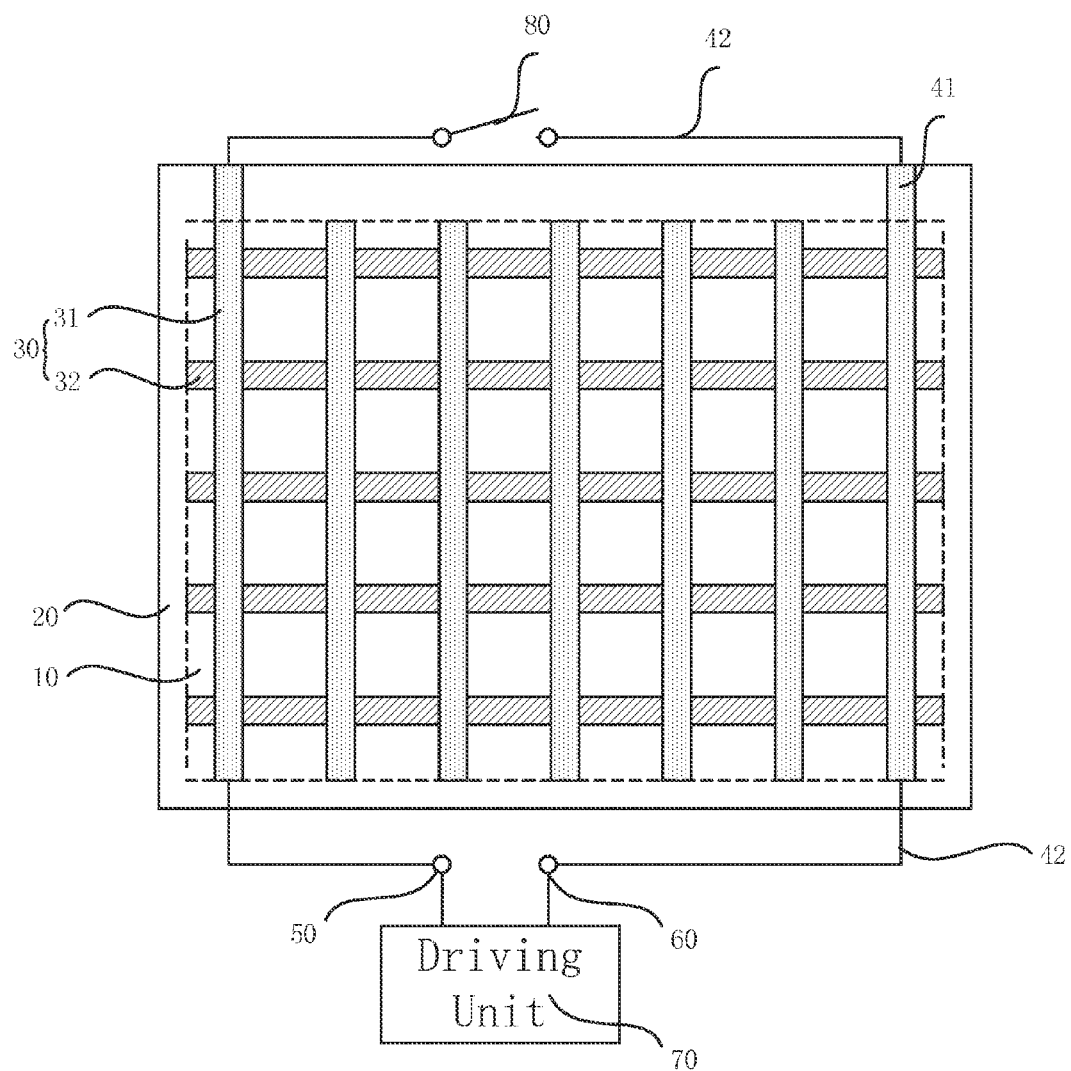

FIG. 2A and FIG. 2B are schematic views showing structures of a touch panel according to the embodiment of the present invention, and the present embodiment differs from the previous embodiment in that another structure of the electromagnetic communication line with a turn of coil is provided in the present embodiment, and reference may be made to the description of the previous embodiment for other structure features.

In the present embodiment, the electromagnetic functional line 40 may include a coil having one or more turns, and a single turn coil is taken as an example only and not to limit the scope of the present invention. The electromagnetic functional line 40 includes an electrode wiring 41 and an integrated circuit wiring 42, the electrode wiring 42 being arranged in the active area 20; and the electromagnetic communication line includes two touch electrodes 30 (left-hand side and right-hand side) which are electrically connected with each other by the electrode wiring 41 or the integrated circuit wiring 42 to form the turn of the coil, and a control switch 80 is interposed in the electrode wiring 41 or the integrated circuit wiring 42 electrically connected between the two touch electrodes.

In the previous embodiment, one touch electrode 30 in the active area 10 is used by each turn of the coil, but in the present embodiment, two touch electrodes 30 are used by each turn of coil. These two touch electrodes 30 are electrically connected to form one turn of the coil by the electrode wiring 41 and the integrated circuit wiring 42. In order to maximize the area surrounded by the coil, preferably two touch electrodes farthest away from each other are arranged to form the coil. Additionally, in order to make these two touch electrodes 30 to separately operate during the implementation of the touch sensing function, a controlling switch 80 is disposed between these two touch electrodes 30, so that these two touch electrodes 30 are separated and operate separately in performing the touch sensing function when the controlling switch 80 is open, and the controlling switch 80 is closed to form a single turn coil in performing the electromagnetic communication function.

The arrangement of the electrode wiring 41 and the integrated circuit wiring 42 between those two touch electrodes 30 may vary, for example, the electrode wiring 41 and the integrated circuit wiring 42 are electrically connected between those two touch electrodes 30 and the controlling switch 80 is formed, as illustrated in FIG. 2A. Alternatively, the integrated circuit wiring 42 is electrically connected between the those two touch electrodes 30 and the controlling switch 80 is formed, as illustrated in FIG. 2B, in this case, the controlling switch 80 may be interposed in the integrated circuit wiring 42 at a low process cost and low control complexity. Or, it is possible to use only the electrode wiring 41 or the integrated circuit wiring 42 as the electromagnetic line 40 for the electrical connection. It is noted that those two touch electrodes 30 are electrically connected with each other merely through the integrated circuit wiring 42 and the controlling switch 80 to form a single turn coil (not shown in FIG. 2B).

It is understood by those skilled in the art that the first terminal 50 and the second terminal 60 are also provided for a turn of coil formed between those two touch electrodes 30, and the number of the first terminal 50 and the second terminal 60 may be increased correspondingly to input appropriated electrical signals to implement the touch sensing function and the electromagnetic communication function. For example, the first terminal 50 and the second terminal 60 (not shown in FIG. 2B) may be additionally provided at both sides of the controlling switch 80, thus the turn of coil includes two or more pairs of the first terminals 50 and the second terminals 60, such that in performing the touch sensing function, touch sensing signals are respectively inputted to the various touch electrodes 30 through the respective first terminals 50 and the respective second terminals 60, to reduce voltage drops of the touch sensing signals at the touch electrodes and improve the touch sensing performance.

Based on the present embodiment, the number of the touch electrodes for forming a single turn coil is not limited to two, and more touch electrodes may be involved in forming a single turn coil, in a way similar to that described as above. For an electromagnetic communication line including a plurality of turns of the coil, the structure of each turn of the coil may be the same or different, for example, the structure of each turn of the coil may be that described in the previous embodiment.

In embodiments of the present invention, another structure of the electromagnetic communication line with one turn of the coil is that the electromagnetic communication line in each turn of the coil is merely implemented by the electrode wiring (not shown in FIGS. 2A and 2B). This solution may minimize the integrated circuit wirings.

Figure 3:
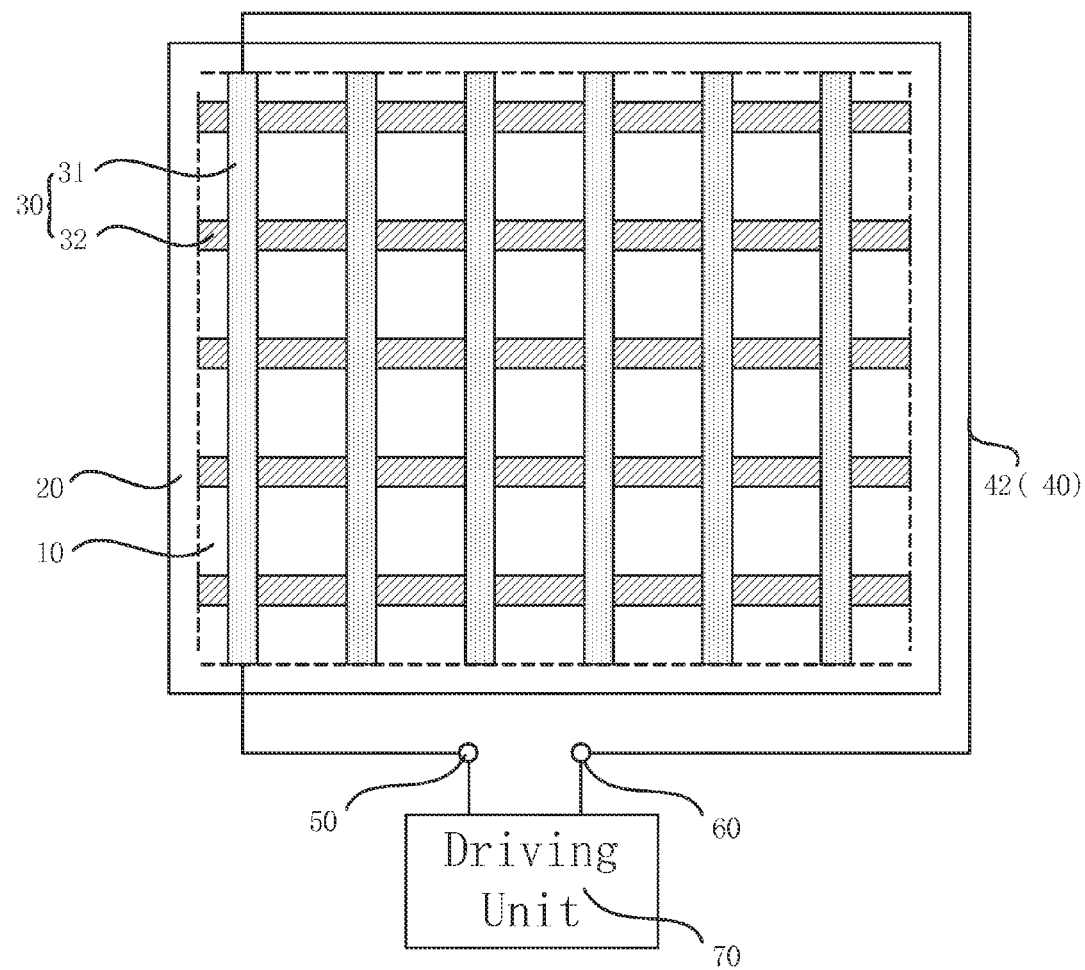
FIG. 3 is a schematic view showing another structure of a touch panel according to the previous embodiment of the present invention.

FIG. 3 is a schematic view showing another structure of a touch panel according to an embodiment of the present invention, which differs from the previous embodiment in that another structure of one turn of the coil (a single turn coil) is provided by the present embodiment, in which merely the integrated circuit wiring 42 is used for forming the electromagnetic functional line 40 in each turn of coil, as illustrated in FIG. 3. An advantage of this solution is that the occupied area in the non-active area 20 may be reduced to implement a narrow frame of the touch panel.

Another Embodiment

Figure 4:
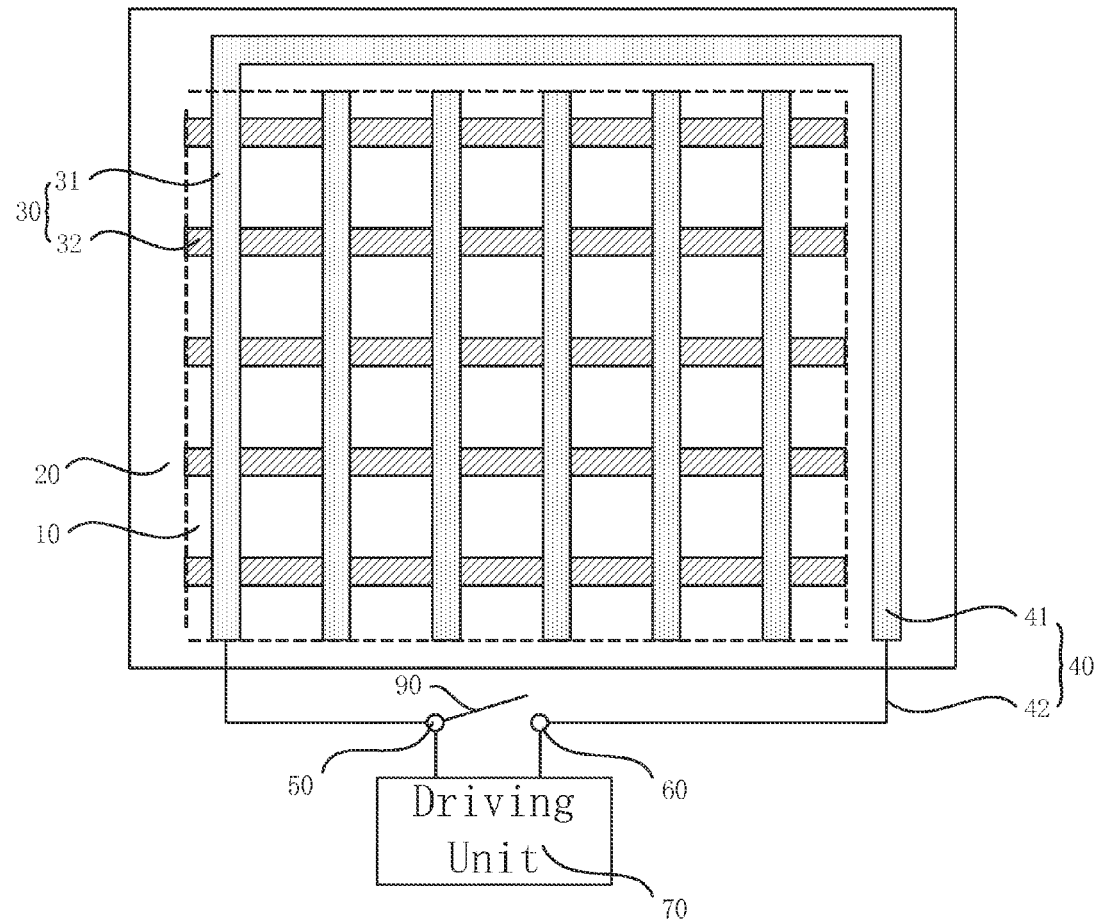
FIG. 4 is a schematic view showing a structure of a touch panel according to another embodiment of the present invention.

FIG. 4 is a schematic view showing a structure of a touch panel according to the embodiment of the present invention. The present embodiment differs from the previous embodiment in that the structure of a single turn coil with an added switch 90 is provided in the present embodiment.

In the embodiment, the switch 90 electrically connected in the electromagnetic communication line is further disposed in the touch panel, and is configured to close to implement the touch sensing function and open to implement the electromagnetic communication function.

In the case where a first terminal 50 and a second terminal 60 are present in an electromagnetic communication line, the switch 90 is connected to the first terminal 50 and the second terminal 60 to open or close the electrical connection between the first and second terminals. The switch 90 may be controlled by circuitry (not shown) of the touch panel. For example, the switch 90 when closed places the turn of the coil in a closed coil state, to implement the touch sensing function, thus a touch sensing signal needs to be inputted to merely one terminal of the coil. This solution may simplify the controlling mechanism of the touch sensing function and reduce e cost. The switch 90 is generally electrically connected between the first terminal 50 and the second terminal 60.

In the touch panel of the present embodiment, a driving unit 70 is further arranged to implement at least one of the following functions:

a fifth function of controlling the switch 90 electrically connected in the electromagnetic communication line to open and inputting an electromagnetic signal to the first terminal 50 and the second terminal 60 of the electromagnetic communication line, to implement the electromagnetic communication function; and a sixth function of controlling the switch 90 electrically connected in the electromagnetic communication line to close to short connect the first terminal 50 with the second terminal 60 and inputting a touch sensing signal to the first terminal 50 and/or the second terminal 60 of the electromagnetic communication line, to implement the touch sensing function.

After the switch 90 is added, for the fifth function of the driving unit 70, the switch 90 is firstly controlled by circuitry (not shown) of the touch panel to open so that the electromagnetic communication line is disconnected, then two inverted electromagnetic signals are respectively inputted (provided) to the first terminal 50 and the second terminal 60 to form an electromagnetic circuit, such that the electromagnetic communication function is implemented.

For the sixth function of the driving unit 70, the switch 90 is firstly controlled to close to connect the first terminal 50 and the second terminal 60 with each other and short the electromagnetic communication line, so that a touch sensing signal can be inputted to either one of the first terminal 50 and the second terminal 60 to implement the electromagnetic communication function.

Another Embodiment

Figure 5:
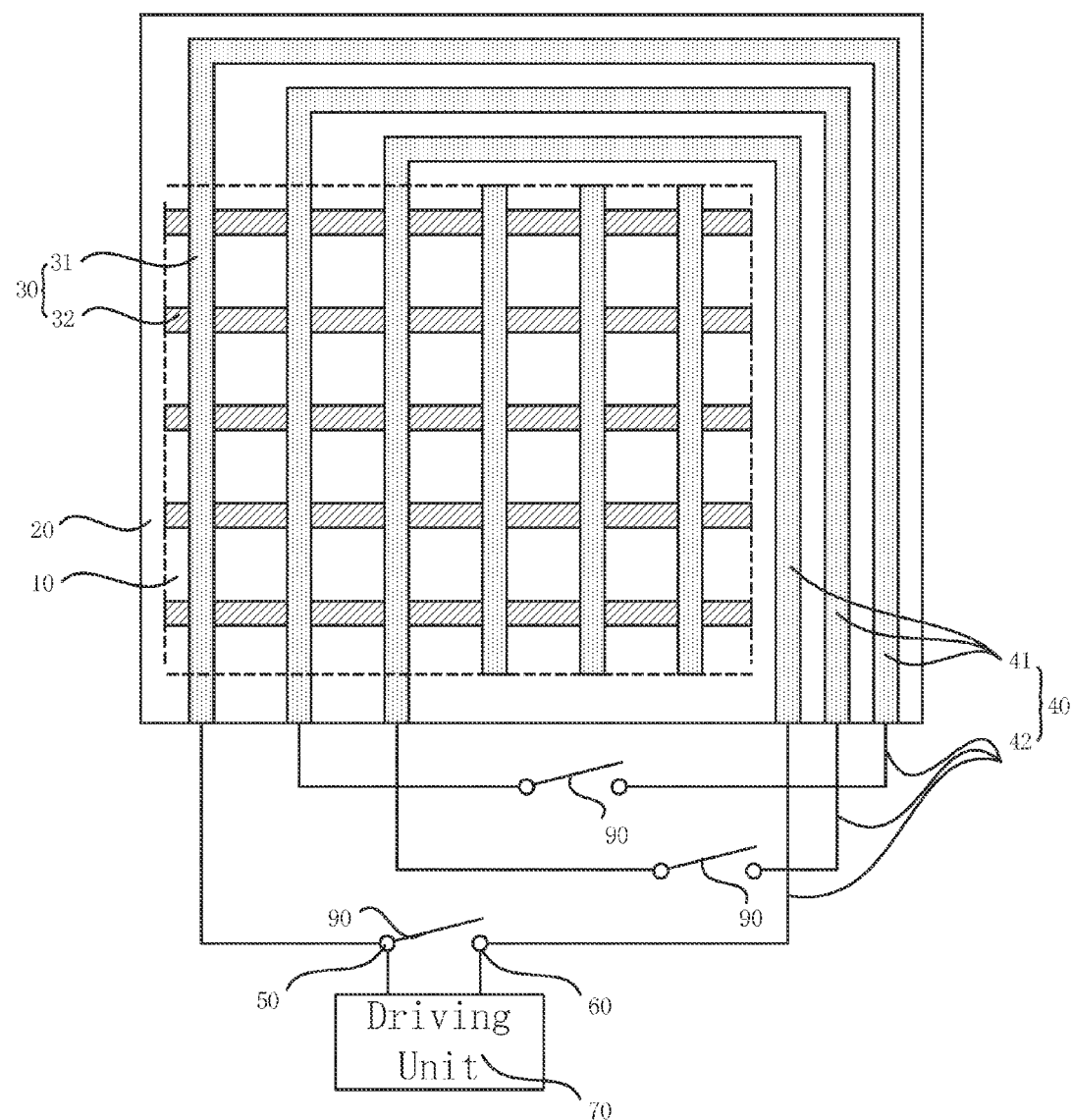
FIG. 5 is a schematic view showing a structure of a touch panel according to another embodiment of the present invention.

FIG. 5 is a schematic view showing a structure of a touch panel according to the embodiment of the present invention. The structure of the electromagnetic communication line with a single turn coil has been described in all of previous embodiments, the difference between the present embodiment and previous embodiments lies in the electromagnetic communication line with a plurality of turns of the coil are provided in the present embodiment, in which at least one touch electrode line 30 and one electromagnetic functional line 40 are included in each turn of the coil from a plurality of turns of the coil. In the present embodiment, the electromagnetic functional line 40 of each turn of the coil includes the electrode wiring 41 and the integrated circuit wiring 42, and every turn of the coil electrically connected with a touch electrode line 40 is taken as an example to describe, but as understood by those skilled in the art that other structures of each turn of the coil may be applicable to the plurality of turns of the coil.

When the electromagnetic communication function is performed by a plurality of turns of the coil, the first terminal 50 and the second terminal 60 are necessarily used to form a closed circuit, such that electromagnetic electrical signal may flow in the closed circuit. As illustrated in FIG. 5, in a plurality of turns of the coil, the electrode wiring 41 of each turn of the coil is arranged in the non-active area 20 at a side far away from the touch electrode 30 electrically connected with the electrode wiring, and the electrode wirings of the plurality of turns of the coil are sequentially arranged (without crossing one another), but the integrated circuit wirings of the plurality of turns of the coil may cross one another. Of course, the touch electrodes 30 reused by neighboring turns of the coil may not be adjacent to each other, but in order to extend magnetic flux area as big as possible, the reused touch electrodes 30 are preferable arranged to be adjacent to each other and the electrode extending 41 of each turn of the coil is still arranged as far as possible away from the touch electrode 30 being reused and electrically connected with the electrode wiring. In the technical solution illustrated in FIG. 5, in order to implement series connection of a plurality of turns of the coil, the integrated circuit wirings 42 in the plurality turns of the coil are arranged to cross one another and electrically insulated from each other, but respective electrode wirings 41 in the plurality of turns of the coils are sequentially arranged in the touch panel, that is, they are arranged without crossing one another, which simplifies the process for manufacturing the touch panel.

Another Embodiment

Figure 6:
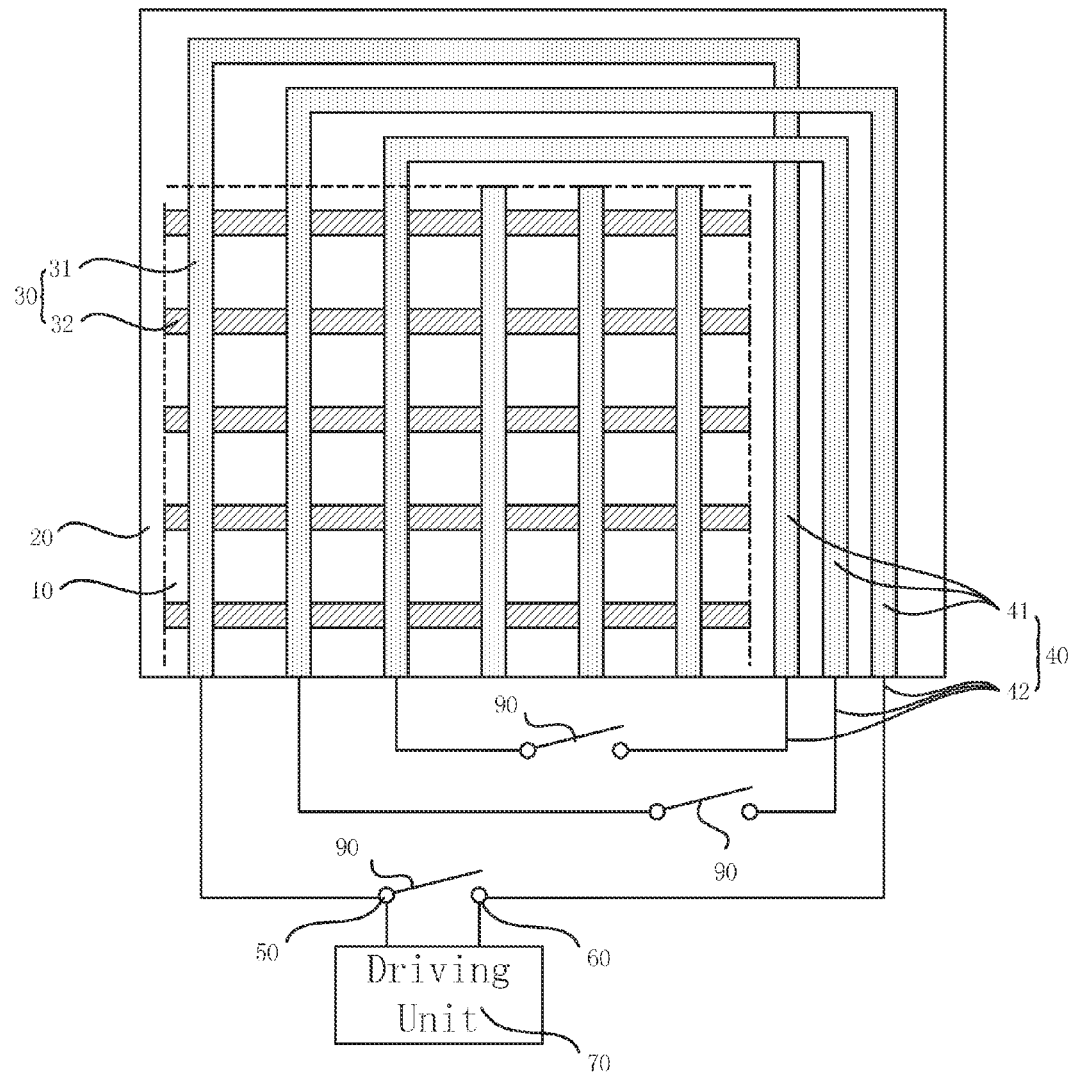
FIG. 6 is a schematic view showing a structure of a touch panel according to another embodiment of the present invention.

FIG. 6 is a schematic view showing a structure of a touch panel according to the embodiment of the present invention, the present embodiment differs from the embodiment in that the arrangement of a plurality of turns of coils are changed, that is, in plurality of turns of coils, the electrode wiring 41 of each turn of coil are arranged in the non-active area 20 at a side far away the touch electrodes 30 electrically connected with the electrode wiring, and the electrode wirings of the plurality of turns of coils cross one another, the integrated circuit wirings 42 of turns of the coil may be arranged to cross one other or may be arranged in sequence.

As illustrated in FIG. 6, preferably, the integrated circuit wirings 42 are sequentially arranged without crossing one another, the electrode wirings cross one another, so that the turns of the coil are connected in series. This arrangement may reduce the complexity of the layout of the integrated circuit wirings 42. The electrode wirings 41 may be arranged to cross one another and electrically insulated from each other based on connections via holes or connections between different layers.

Of course, it is understood by those skilled in the art that whether the electrode wirings or the integrated circuit wirings are arranged to cross one another may be determined by the arrangement of the lines, which is not limited to both examples described above. Each turn of the coil is not limited to include both electrode wiring and the integrated circuit wiring, any structure of the electromagnetic functional line in the previous embodiments may be applicable.

Another Embodiment

In the previous embodiments, structures for arranging the touch electrode and the electromagnetic functional line in the touch panel are described, the touch panel provided in the present embodiment may be based on the technical solutions in the previous embodiments, it is preferable to introduce the arrangement position, which is relative to the touch panel, of the touch electrode and the electromagnetic functional line in the touch panel.

Figure 7A:
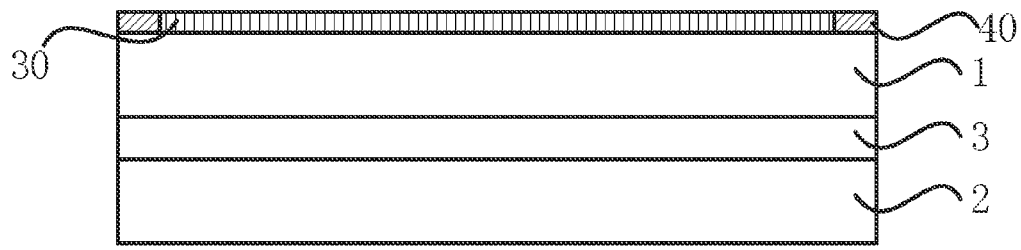
FIG. 7A to FIG. 7D are schematic views showing structures of a touch panel according to another embodiment of the present invention.

In the present embodiment, the touch panel includes a first substrate 1 and a second substrate 2 disposed opposite to the first substrate 1. For a liquid crystal display panel, the first substrate 1 may be a color film substrate, the second substrate 2 may be an array substrate, and a liquid crystal layer 3 is arranged between the first substrate 1 and the second substrate 2; for an organic light emitting panel, a light emitting material layer is arranged between the first substrate 1 and the second substrate 2; a touch electrode 30 and an electromagnetic functional line 40 are disposed at an external side of the first substrate 1, as illustrated in FIG. 7A.

Figure 7B:
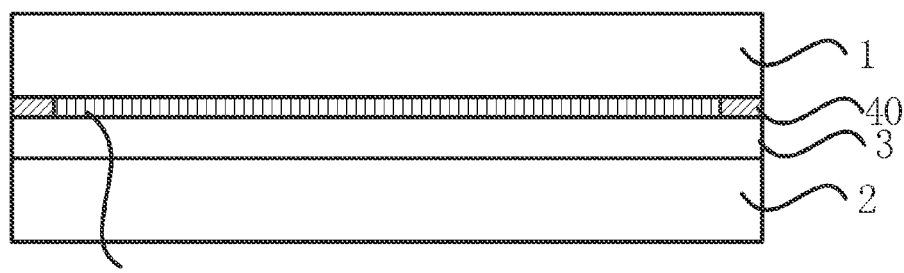

In an embodiment, the touch electrode 30 and the electromagnetic functional line 40 are disposed at an internal side of the first substrate 1, as illustrated in FIG. 7B.

Figure 7C:
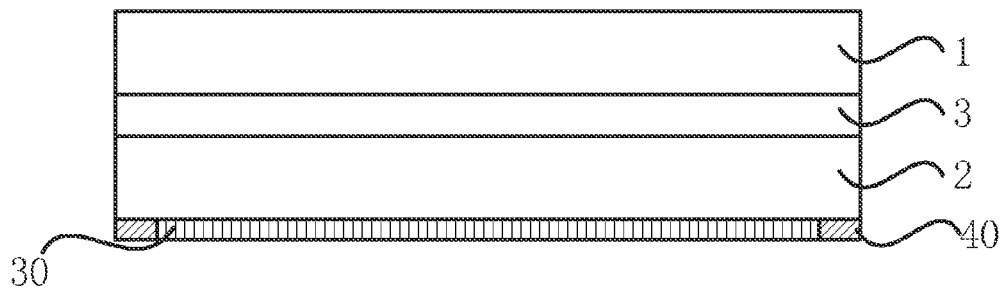

In another embodiment, the touch electrode 30 and the electromagnetic functional line 40 are arranged at an external side of the second substrate 2, as illustrated in FIG. 7C.

Figure 7D:
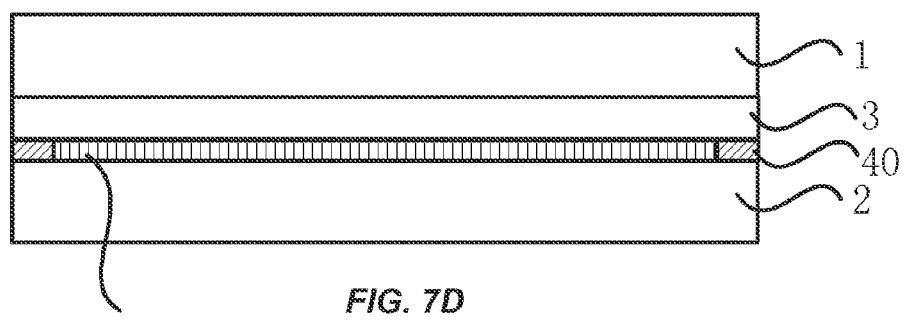

In yet another embodiment, the touch electrode 30 and the electromagnetic functional line 40 are arranged at an internal side of the second substrate 2, as illustrated in FIG. 7D.

In the previous cases, the touch electrode and the electromagnetic functional line may be arranged in the same layer, and integrated with the first substrate or the second substrate, thus to reduce errors caused by assembling.

Another Embodiment

In an embodiment, a method for driving the touch panel is provided. The method is applicable to drive the touch panel provided by the embodiment of FIG. 1, and the method includes:

inputting (providing) an electrical signal to the first terminal of the electromagnetic communication line or inputting the same electrical signal to both the first terminal and the second terminal of the electromagnetic communication line to implement the touch sensing function; or inputting (providing) different electromagnetic signals to the first terminal and the second terminal of the electromagnetic communication line to implement the electromagnetic communication function.

The driving method in the present embodiment may be implemented based on the touch panel provided by the present disclosure, and the two previous described steps are not limited to the order in which they are performed. They may be performed simultaneously or in a time division multiplex manner to implement two following functions.

The step of inputting (providing) an electrical signal to the first terminal and/or the second terminal of the electromagnetic communication line to implement the touch sensing function and the electromagnetic communication function includes at least one of the following tasks or operations:

inputting (providing) a touch sensing signal to the first terminal of the electromagnetic communication line and controlling the second terminal to suspend (be in a floating state or in a tri-state) to implement the touch sensing function;

inputting (providing) a touch sensing signal to the first terminal and the second terminal of the electromagnetic communication line to implement the touch sensing function;

inputting (providing) an electromagnetic signal to the first terminal and the second terminal of the electromagnetic communication line to implement the electromagnetic communication function; and inputting (providing) combined touch sensing signal and electromagnetic signal which have different frequencies to the first terminal and the second terminal of the electromagnetic communication line to simultaneously implement the touch sensing function and the electromagnetic communication function.

Further, the touch panel further includes a switch, which is configured to short the electromagnetic communication line to perform the touch sensing function, and open the electromagnetic communication line to perform the electromagnetic communication function. In an embodiment, the switch can be controlled by circuitry (not shown) embedded in the touch panel or external to the touch panel. The step of inputting (providing) an electrical signal to the first terminal and/or the second terminal of the electromagnetic communication line to implement the touch sensing function and the electromagnetic communication function includes at least one of the following operations:

controlling the switch electrically connected in the electromagnetic communication line to open and inputting an electromagnetic signal into the first terminal and the second terminal of the electromagnetic communication line to implement the electromagnetic communication function; and controlling the switch electrically connected in the electromagnetic communication line to close to connect the first terminal with the second terminal to form a short circuit and inputting a touch sensing signal into the first terminal and/or the second terminal of the electromagnetic communication line to implement the touch sensing function.

The descriptions of respective driving functions may refer to previous embodiments. In the method for driving the touch panel in embodiments of the present disclosure, different electrical signals are controlled to input, for example, when performing the touch sensing function, same electrical signal is inputted into the first terminal and the second terminal, when performing the electromagnetic communication function, different electrical signals are inputted into the first terminal and the second terminal, such that current flows in the electromagnetic communication line upon the presence of voltage difference. The touch electrode is reused to implement the electromagnetic communication function, such that the addition of the original structure of the touch panel is reduced, which satisfies the requirement of the light-weight and slim feature of the product.

Based on the touch panel provided in respective embodiments in the present disclosure, an electronic device is provided in the present embodiment, which includes the touch panel provided in any embodiment in the present disclosure.

The electronic device may be a mobile phone, a Personal Computer (PC) and a tablet Computer, which requires touch sensing function and electromagnetic communication function, the electromagnetic communication function includes but is not limited to NFC features, such as electromagnetic pen functions.

The electronic device may or may not be configured to implement a display function. When performing the display function, the electronic device may include a display screen, where the touching panel is integrated in the interior of the display screen of the electronic device, for example, the touch panel is integrated into an in-cell type of the device with a touching function, or the touch panel is respectively disposed at a displaying side of the display screen, for example, the touch panel is integrated into an on-cell type of the device with a touching function.

Figure 8:
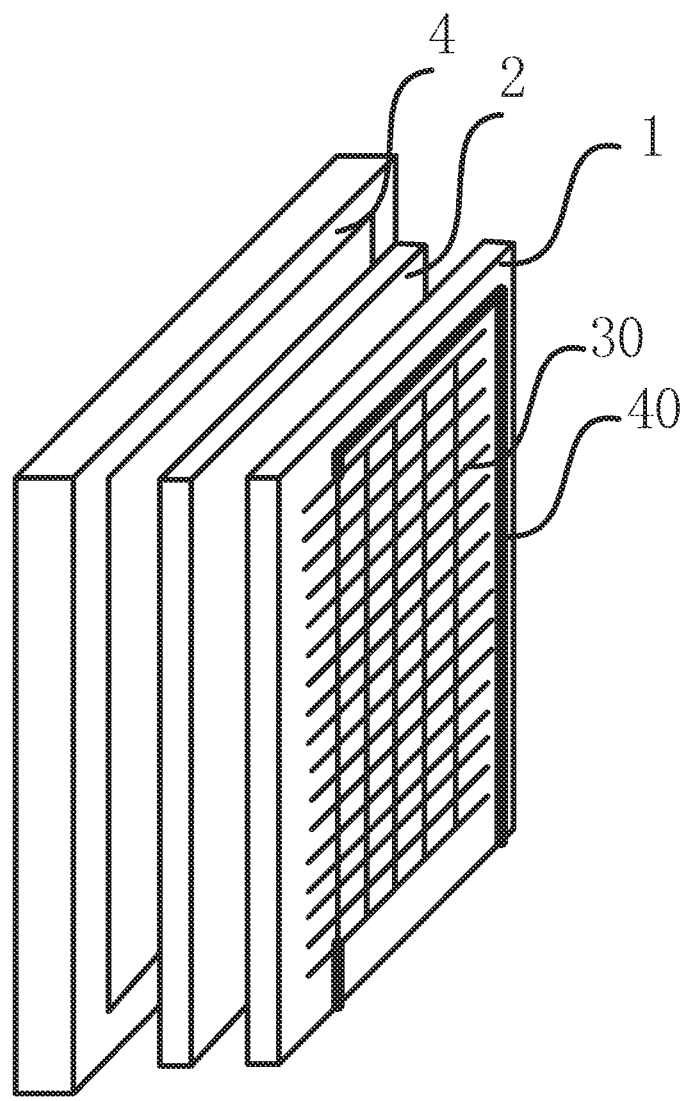
FIG. 8 is a schematic view showing a structure of an electronic device with a display screen according to an embodiment of the present invention.

The touch panel is integrated in the interior of the display screen, and the specific method for the integration may include a step for forming touch electrodes when the display screen, such as including the first substrate and the second substrate, is manufactured, and the touch electrode is encapsulated in the display screen, as illustrated in FIG. 7A to FIG. 7D, which may make the product light-weight and slim, while reducing the manufacture cost and improving productivity. In the case that a touch panel and a display screen are separately configured, the finished touch panel is assembled with an individual display screen, which is then encapsulated together, and the touch panel is generally arranged at one side of the display screen to provide the display content to user for viewing and the touch operation is simultaneously performed. The display screen may be a Liquid Crystal Display (LCD) screen, an Organic Light Emitting Diode (OLED) display screen or an electronic paper. As illustrated in FIG. 8, the FIG. 8 is a schematic view showing a structure of an electronic device with a display screen and a touch panel according to embodiments of the present disclosure.

As illustrated in FIG. 8, the electronic device includes any touch panel according to any one of embodiments of the present disclosure, the electronic device is integrated in the interior of the display screen, particularly, the touch panel includes a first substrate 1 and a second substrate 2 disposed opposite to the first substrate, a touch electrode 30 and an electromagnetic functional line 40 are located at an external side of the substrate 1, of course, the touch electrode 30 and an electromagnetic functional line 40 may also be arranged at an internal side of the first substrate 1 or at the internal or external side of the substrate 2 (not shown in FIG. 8). When the display screen is a liquid crystal display screen, the display screen may include the first substrate 1 and the second substrate 2 disposed opposite to each other, a liquid layer is arranged between the first substrate 1 and the second substrate 2 (not shown in FIG. 8); and when the display screen is an Organic Light Emitting Diode display screen, the light emitting material is arranged between the first substrate 1 and the second substrate 2 disposed opposite to the first substrate 1. The electronic device may further include a frame 4 which is configured to protect or fix the touch panel.

Alternatively, distinguishing from a case in which the touch panel and the display screen are integrated at the same side of an electronic device as illustrated in FIG. 8, the touch panel and the display screen may be arranged at the different sides of the electronic device, for example, in a tablet computer, the touch panel for simulating the mouse is disposed at one side of the electronic device, and the display screen is disposed at another side of the electronic device, when the electronic device is unfolded.

In an embodiment, the touch panel may not include a display screen, that is, for an electronic device without the implementation of the display function, merely a touch panel, a frame of the electronic device and other functional structure are included.

Although the embodiments and technical principles adopted herein have been described as above, it is understood by those skilled in the art that the present invention is not limited to the particular embodiments. The present invention can be changed, modified and replaced by those skilled in the art without departing from the scope and principle of the present invention. Therefore, though the present invention has been specifically described through the previous embodiments, the present invention is not merely limited to the previous embodiments; other equivalent embodiments may be made with the concept of the present invention, and the scope of the present invention is defined by the appended claims.

What is claimed is:

1. A touch panel comprising:
    an active area and an inactive area;
    a touch electrode located in the active area;
    an electromagnetic functional line electrically connected to the touch electrode to form an electromagnetic communication line, wherein the electromagnetic communication line comprises a first terminal and a second terminal;
    a switch electrically connected to the electromagnetic communication line; and
    a driving unit coupling to the first terminal and the second terminal,
    wherein the driving unit is configured to,
    control the switch to be closed to connect the first terminal with the second terminal together and to output a touch sensing signal to the electromagnetic communication line to implement a touch sensing function; and
    control the switch to be open and to output an electromagnetic signal to the electromagnetic communication line to implement an electromagnetic communication function.

2. The touch panel according to claim 1, further comprising
    a first substrate comprising a first side and a second side; and
    a second substrate opposite to the first substrate, and comprising a third side facing the second side of the first substrate and a fourth side;
    wherein both the touch electrode and the electromagnetic functional line are disposed on the second side of the first substrate.

3. The touch panel according to claim 1, wherein the electromagnetic communication line comprises a coil having one or more turns, each turn of the coil comprising at least one touch electrode and an electromagnetic functional line.

4. The touch panel according to claim 3, wherein each turn of the coil comprises at least one of following structures:
    an electrode wiring and an integrated circuit wiring, the electrode wiring being arranged in the non-active area, the electromagnetic communication line comprising one touch electrode to form a turn of the coil.

5. The touch panel according to claim 4, wherein in the one turn of the coil, the electrode wiring is disposed in the non-active area at a side away from the touch electrode electrically connected with the electrode wiring.

6. The touch panel according to claim 5, wherein the electrode wiring is arranged in a fold line.

7. The touch panel according to claim 2, wherein the first substrate is a color film substrate, the second substrate is an array substrate.

8. The touch panel according to claim 4, wherein,
the electrode wiring of each turn of the coil is disposed in the non-active area at a side away from the touch electrode electrically connected with the electrode wiring, the electrode wirings of the turns of the coil are sequentially arranged, and the integrated circuit wirings of the turns of the coil cross one another.

9. The touch panel according to claim 4, wherein the touch electrode and the electrode wiring are made of a same material.

10. The touch panel according to claim 4, wherein the electrode wiring is made of a metal or Indium Oxide.

11. The touch panel according to claim 1, wherein the driving unit is further configured to output combined touch sensing signal having a first frequency and electromagnetic signal having a second frequency different from the first frequency, to the electromagnetic communication line via the first terminal and the second terminal, to simultaneously implement a touch sensing function and an electromagnetic communication function.

12. The touch panel according to claim 11, wherein the first frequency is lower than the second frequency.

13. The touch panel according to claim 1, wherein the driving unit is further configured to provide a first electromagnetic signal with a first voltage to the first terminal and simultaneously provide a second electromagnetic signal with a second voltage to the second terminal.

14. A method for driving a touch panel, wherein the touch panel comprises an active area and an inactive area, a touch electrode located in the active area, an electromagnetic functional line electrically connected to the touch electrode to form an electromagnetic communication line, a switch electrically connected to the electromagnetic communication line, and a driving unit, wherein the electromagnetic communication line comprises a first terminal and a second terminal each coupled to the driving unit, the method comprising:
controlling, by the driving unit, the switch to be closed to connect the first terminal with the second terminal together;
outputting, by the driving unit, a touch sensing signal to the electromagnetic communication line to implement a touch sensing function;
controlling, by the driving unit, the switch to be open; and
outputting, by the driving unit, an electromagnetic signal to the electromagnetic communication line to implement an electromagnetic communication function.

* * * * *